United States Patent [19]

Whyte

[11] 4,395,186
[45] Jul. 26, 1983

[54] VEHICLE FOR TENDING LOW GROWING VEGETATION

[75] Inventor: Garry R. Whyte, Portland, Oreg.

[73] Assignee: Turtle Tractor Company, Portland, Oreg.

[21] Appl. No.: 176,193

[22] Filed: Aug. 7, 1980

[51] Int. Cl.³ .............................................. B60P 1/00
[52] U.S. Cl. ................................. 414/528; 280/32.5; 280/100; 180/65 F
[58] Field of Search ............... 280/700, 721, 723, 100; 180/242, 65 F; 414/528, 508; 267/57, 154; 62/239

[56] References Cited

U.S. PATENT DOCUMENTS

| | | | |
|---|---|---|---|
| 1,868,912 | 7/1932 | Plank | 280/100 |
| 1,889,686 | 11/1932 | McKee | 62/239 |
| 2,317,606 | 4/1943 | Harris | 280/32.5 |
| 2,758,660 | 8/1956 | Bouffort | 180/6.7 |
| 2,825,273 | 3/1958 | Faucheux | 280/32.5 X |
| 3,033,303 | 5/1962 | Weekly | 180/65 |
| 3,037,570 | 6/1962 | Olson | 180/6.5 X |
| 3,071,366 | 1/1963 | Loehr | 280/721 X |
| 3,361,224 | 1/1968 | McKim | 180/65 |
| 3,469,646 | 9/1969 | O'Connor | 180/65 F X |

Primary Examiner—Andres Kashnikow
Assistant Examiner—L. E. Williams
Attorney, Agent, or Firm—Limbach, Limbach & Sutton

[57] ABSTRACT

A powered vehicle for tending low-growing vegetation comprising a frame having intersecting cross-braces; a platform mounted to the frame having an engine mounted thereon; front and rear center swing tubes having a torsion bar spring suspension and a double articulated steering system; and four legs, each adjustably mounted within one of the swing tubes, having a motor connected by hydraulic lines to the engine, and supporting a wheel and tire.

1 Claim, 6 Drawing Figures

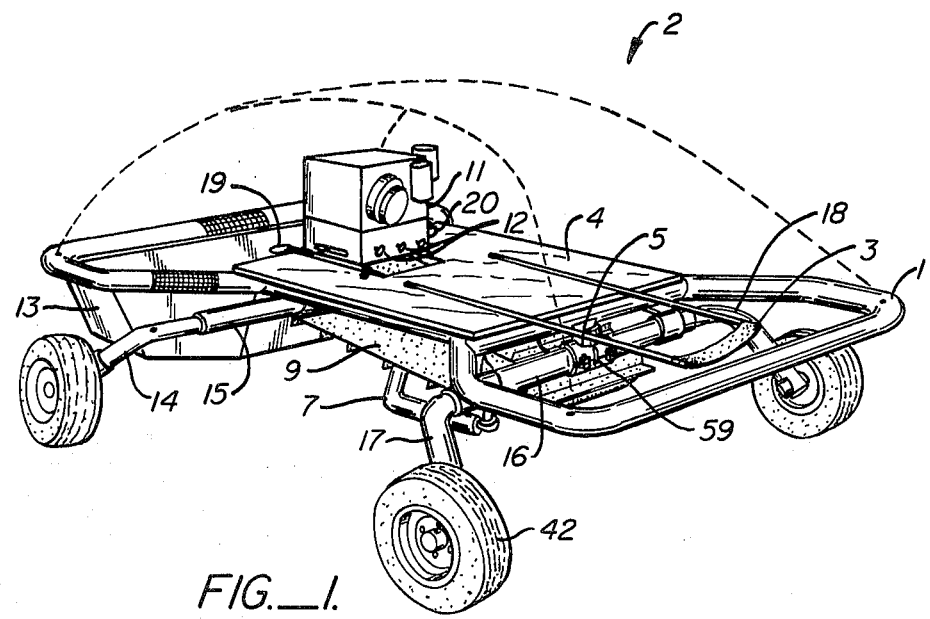
FIG._1.
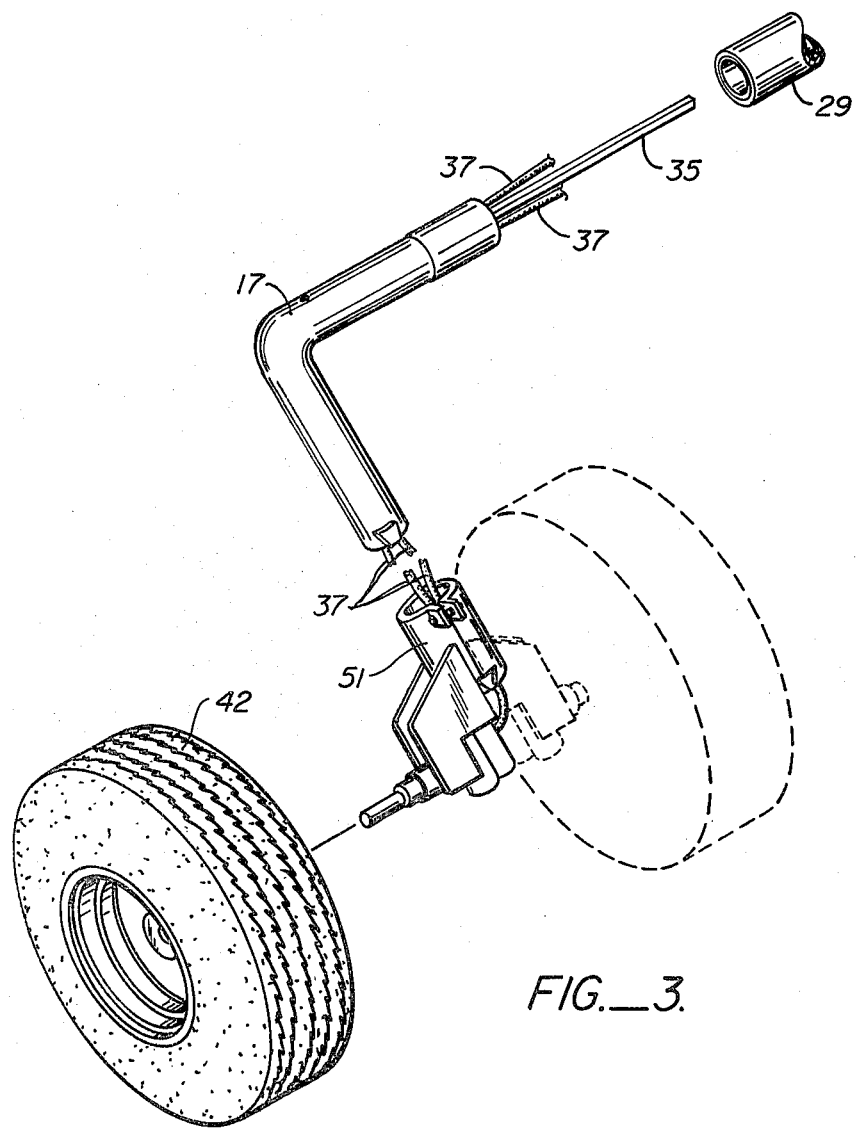
FIG._3.

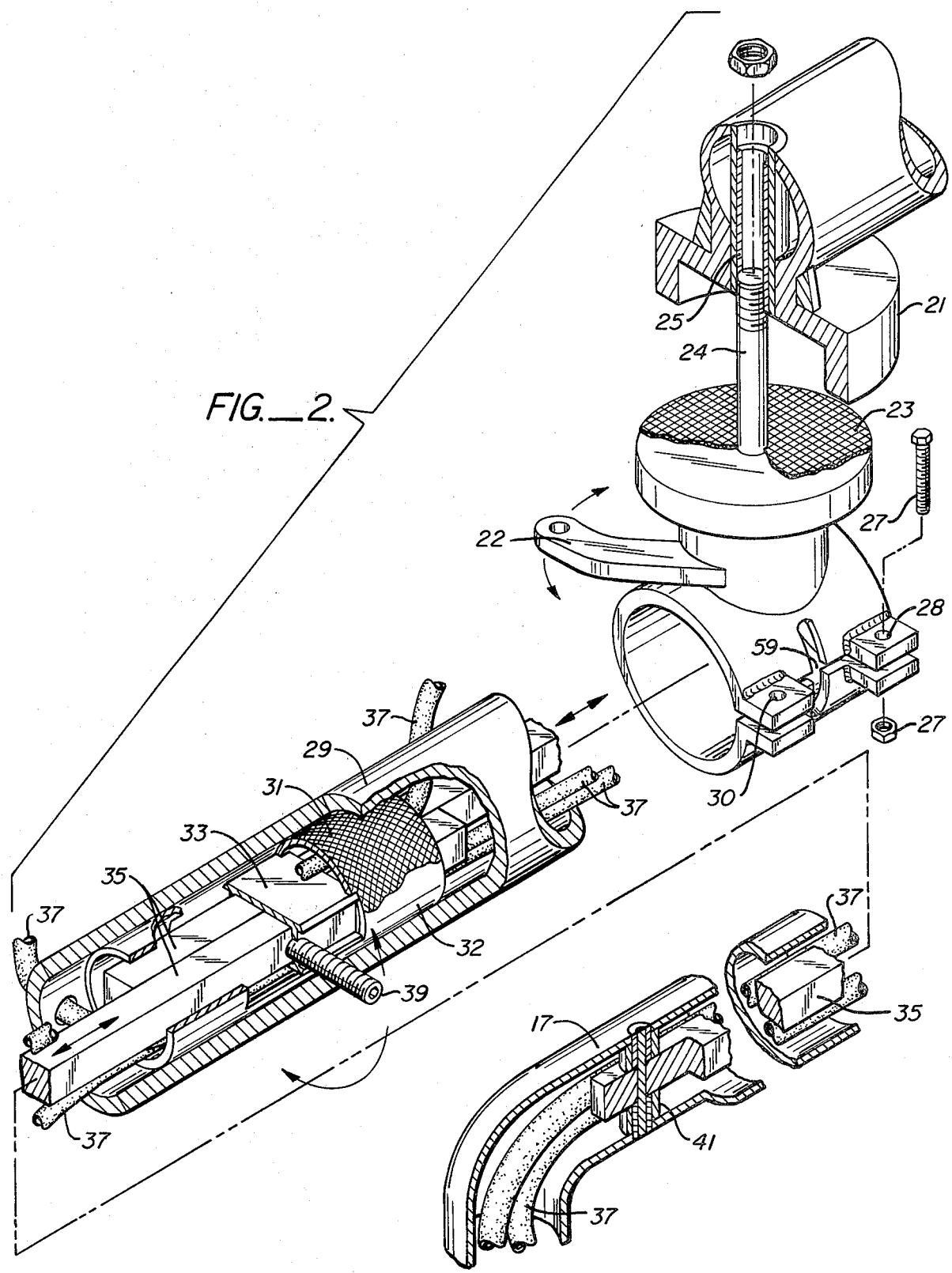

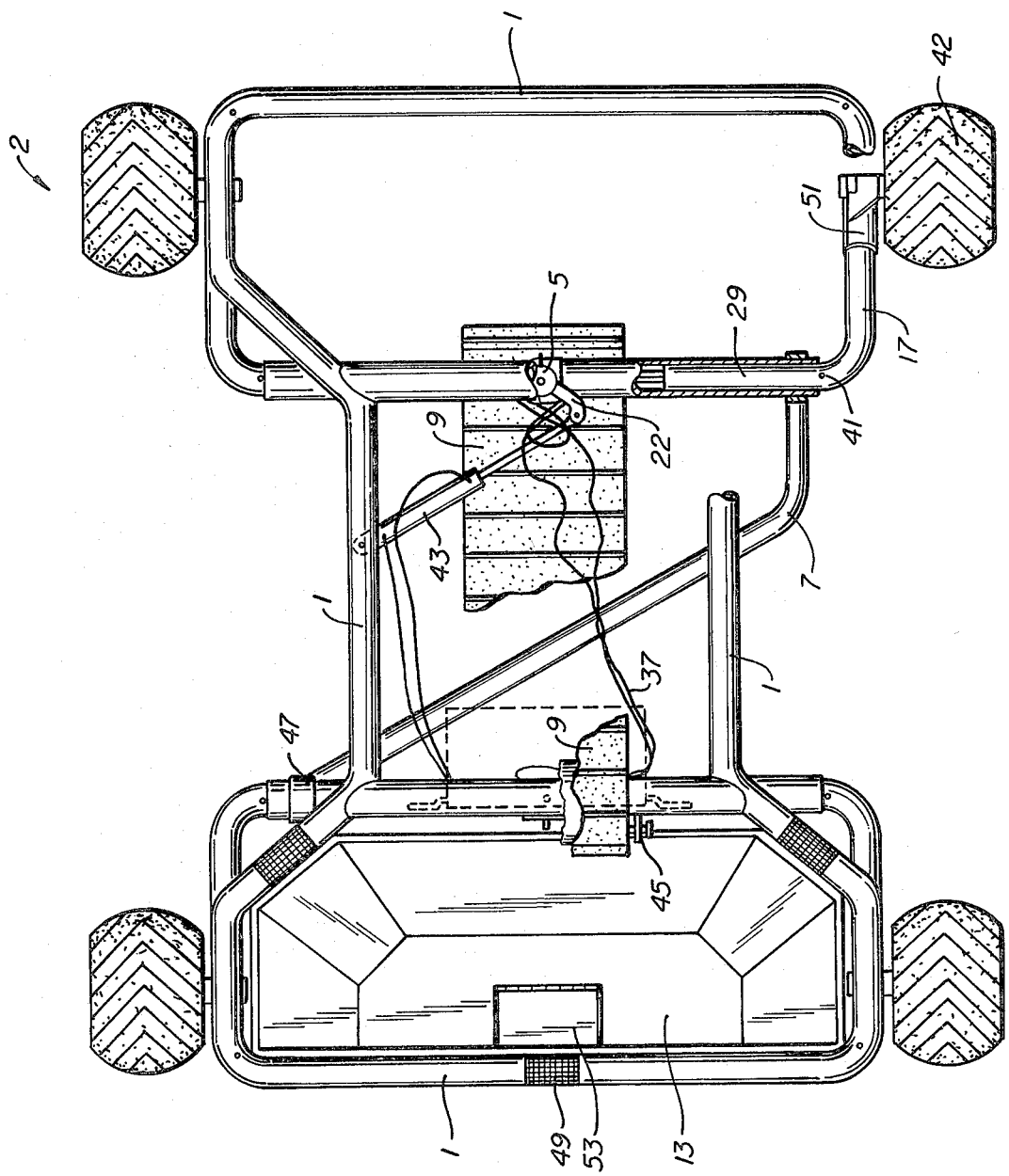
FIG._4A.

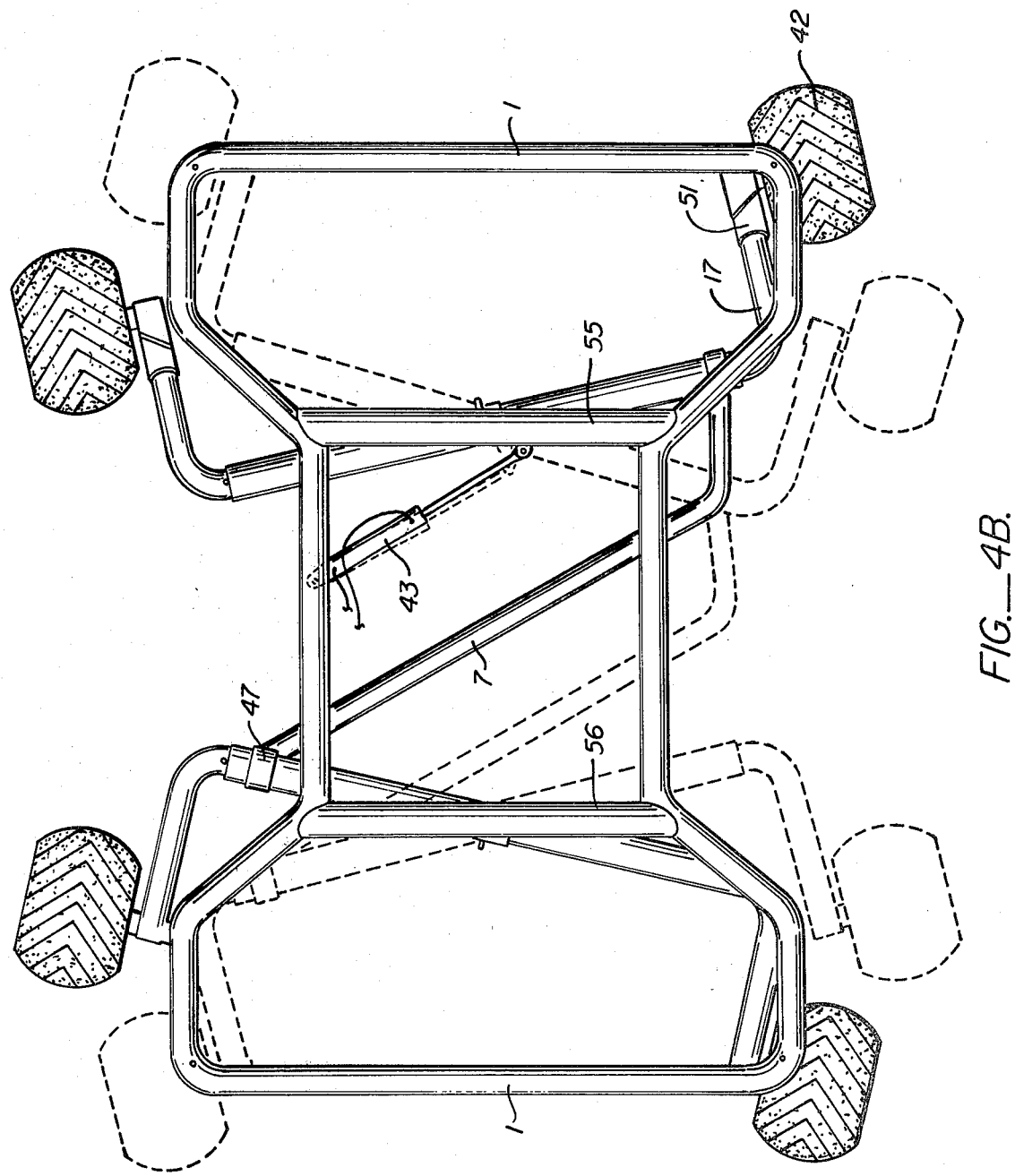
FIG._4B.

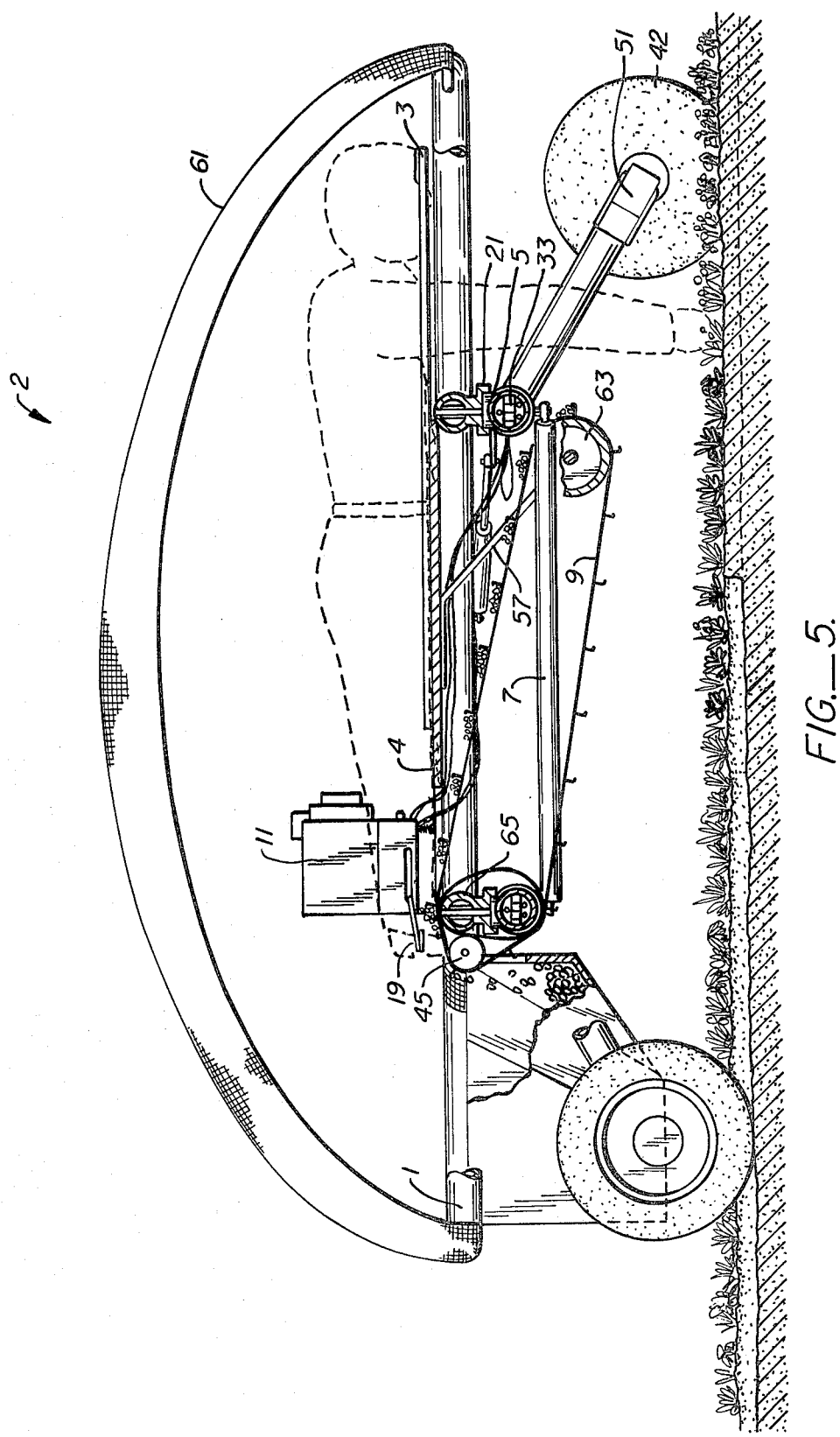
FIG._5.

VEHICLE FOR TENDING LOW GROWING VEGETATION

BACKGROUND OF THE INVENTION

This invention relates to a vehicle for tending low growing vegetation. It can be utilized for such tasks as harvesting, weeding, spraying, pruning and transplanting. It is ideal for harvesting surface dwelling crops.

There has long been a need for a powered vehicle which would reduce the physical burdens on agricultural workers who must tend low growing crops. Previous attempts to solve the problem have utilized cumbersome motorized vehicles whose only advantage was that they permitted the worker to lie in a prone-position rather than stooping over the crops. See U.S. Pat. Nos. 2,825,273; 3,033,303; and 3,361,224. While these vehicles may have enhanced worker comfort, they have not been commercially successful.

It is the principal object of this invention to provide a powered vehicle for tending low-growing vegetation which will reduce field worker injury while enhancing the economic viability of field worker techniques.

Another object of this invention is to provide a light weight vehicle of simple construction which will be durable and relatively inexpensive.

Another object of this invention is to provide a vehicle capable of adaptation to tending crops of differing heights.

Another object of this invention is to provide a vehicle having an adaptable wheel span which permits use in variously spaced seed and crop rows.

Another object of this invention is to provide a vehicle having a conveyor belt for transporting the produce from the picking area to a storage bin which may be refrigerated if the produce so requires.

These objectives have been met by this invention which is a powered vehicle comprising: a frame having intersecting cross-braces; a platform mounted to the frame having an engine mounted thereon; front and rear center swing tubes having a torsion bar spring suspension and a double articulated steering system; and four legs, each adjustably mounted within one of the swing tubes, having a motor connected by hydraulic lines to the engine, and supporting a wheel and tire.

BRIEF DESCRIPTION OF DRAWINGS

FIG. 1 is a perspective view of the vehicle of this invention.

FIG. 2 is an exploded cutaway view of the front swing tube and torsion bar assembly.

FIG. 3 is an exploded view of the adjustable leg and wheel assembly.

FIG. 4A is a top plain view of the double articulated steering assembly.

FIG. 4B is a top plain view of the double articulated steering assembly overlaying a phantom view of the vehicle in a turning mode.

FIG. 5 is a side view of the vehicle having a canopy attached.

DETAILED DESCRIPTION OF DRAWINGS

FIG. 1 is a perspective view of the vehicle 2 of this invention having a tubular frame 1 and a spring headrest 3. Mounted on frame 1 is a platform 4 on which is mounted an engine 11 which drives a hydraulic pump mounted thereon (not shown) supplying pressurized fluid to the wheel motors (not shown in FIG. 1), steering mechanism, and conveyor belt 9. The buttons 12 on engine 11 are pushed for 2-wheel drive and pulled for 4-wheel drive activation. Pedal 19 when pushed propels the vehicle 2 forward and when pulled reverses it. Pedal 20 when pushed turns the vehicle 2 to the right and when pulled turns it to the left.

The conveyor belt 9 rotates on a pulley system (not shown in FIG. 1) to a cargo hopper 13 which receives the produce. Partially shown are a front swing arm tube 29 and a rear swing arm tube 15. The front swing arm tube 29 is set in a front pivot clamp 5. Legs 17 and 18 are mounted in front swing arm tube 29. Leg 14 is mounted in rear swing arm tube 15. The equalizer arm 7 connects front and rear swing arm tubes 29 and 15.

FIG. 2 is an exploded cutaway view of the front swing tube 29 containing therein the torsion bar assembly which controls the angle of the legs, the height of the vehicle, and the steering assembly as more fully described below.

The swing arm tube 29 contains torsion bars 35 and hydraulic hoses 37. The torsion bars 35 are held in a vise 33 tightened by pin 39. The bars 35 in vise 33 are surrounded by a collar 32 and wrapped in a stainless steel mesh screen 31 and glued to the swing tube 29.

When the swing arm tube 29 is inserted into the pivot clamp 5, the tightening pin 39 protrudes through the torsion bar tightening pin slot 59. The swing arm tube 29 is clamped in position by a nut and bolt 27 inserted through hole 28. Similarly, a nut and bolt are inserted through hole 30. The pivot clamp 5 is covered with a disc 23 and has a bearing 24 which is inserted into the cylinder 25 of the pivot clamp bearing 21. Arm 22 is used to pivot bearing 21 in relation to the swing tube 29 in order to steer the vehicle 2. Leg 17 containing torsion bar assembly 41 is inserted into swing tube 29. The rear swing arm tube 15 is similarly mounted in a rear pivot clamp (not shown). The only difference between the front and rear assembly is the presence of the steering arm 22 on the front swing tube 15.

FIG. 3 more adequately conveys the wheel and leg assembly. A wheel motor mount 51 is positioned between leg 17 and wheel 42. The other three wheels are assembled in an identical manner. The phantom of wheel 42 shows the wheel in an alternate position whereby the wheel span is minimized.

FIG. 4A is a top plain view of the double articulated steering assembly. In order to clearly disclose the structure, platform 4 and engine 11 have been omitted from this view. Conveyor belt 9 and frame 1 are partially cutaway.

The steering arm 22 is attached to the front pivot clamp 5 and the steering pressure cylinder 43 is connected by hydraulic lines 37 to the engine 11 (shown only in phantom).

The torsion bar leg pinning assembly 41 permits leg 17 to be adjustably mounted at several positions within the swing arm tube 29. The other legs are also each adjustable to a maximum of ten inches per leg. An equalizer arm clamp 42 is shown attaching the equalizer arm to the rear swing arm tube 15.

The conveyor drive motor 45 is located under the rear swing arm tube 15. A dump chute 53 is shown in the bottom of the cargo hopper 13. A frame sleeve joint 49 is positioned above the hopper 13.

FIG. 4B is a top plain view of the double articulated steering assembly overlaying a phantom view of the vehicle in a turning mode. Frame cross braces 55 and 56 are shown.

FIG. 5 is a side view of vehicle 2 having a canopy 61 attached. The conveyor spring support 57 is mounted to the platform 4 and attached to a front pulley 63. The conveyor 9 rotates between pulley 63 and a rear pulley 65.

The tubular frame of this invention may be constructed from a wide variety of materials, including metals, metal alloys, and durable plastics. Aluminum tubing is an ideal choice because it is durable and light weight. Although tubing size may be varied, 2½ to 3 inch tubing was found satisfactory. The tubes were joined by glue bonding and welding.

The platform may be constructed of plywood, plastic or aluminum. It should be large enough to support a person lying prone. It may be attached to the frame by glue, pins, screws, or nuts and bolts.

For added comfort the platform should be padded with combinations of materials which cushion the worker, absorb shocks, and do not unduly retain heat. The padding should be removable for easy cleaning.

The pump may be gasoline, diesel or electrically powered. In its preferred embodiment it is gas powered, the pump being mounted on the engine which is mounted on a reservoir tank. The pump supplies pressurized fluid for propulsion, steering, and conveyor operation.

The adjustable legs provide great utility in that they may each be adjusted to any of a series of points within a ten inch span to modify the wheel track. Combined with the ability to invert the leg motor assemblies this provides the vehicle with track adjustment capability of 28 inches per leg. This permits the vehicle to be adjusted for use with crops which are planted in varying widths.

The torsion bars are connected to the frame through a collar which surrounds the capturing vise and are glued to the swing tube's inside surfaces. The bars are then pinned to the legs. The collar is surrounded by a stainless steel mesh screen. It has been found that the mesh screen improves the bonding ability of the adhesive by decreasing the oxygen supply to the adhesive and increasing its alkalinity and rate of cure. The collars surrounding the swing tubes have release mechanisms which allow the attitude of the collar tube connection to change, thereby altering the leg angle and the height of the vehicle.

The conveyor belt is ideally made of cleated rubber. The cleating is necessary to prevent forward slippage of the produce. A durable soft plastic might also be used. The width of the belt may vary depending on its intended use, as long as it is not so wide as to interfere with the steering system's connections to the legs. Approximately an eighteen inch width is suitable for most harvesting.

I claim:

1. A powered vehicle for tending low growing vegetation comprising:
    a frame having intersecting cross-braces;
    a platform mounted to the frame having an engine mounted thereon;
    front and rear center swing tubes having a torsion bar spring suspension and a double articulated steering system in which the torsion bars are held by a vise means, said vise means being surrounded by a collar, and said collar being wrapped in a stainless steel mesh screen, and glued to the interior of the swing tube; and
    four legs, each adjustable in at least two directions and mounted within said swing tubes, having a motor connected by hydraulic lines to the engine, and supporting a wheel and tire.

* * * * *